Oct. 13, 1925.
J. GLANG
SAW FILING DEVICE
Filed Oct. 21, 1924
1,557,494
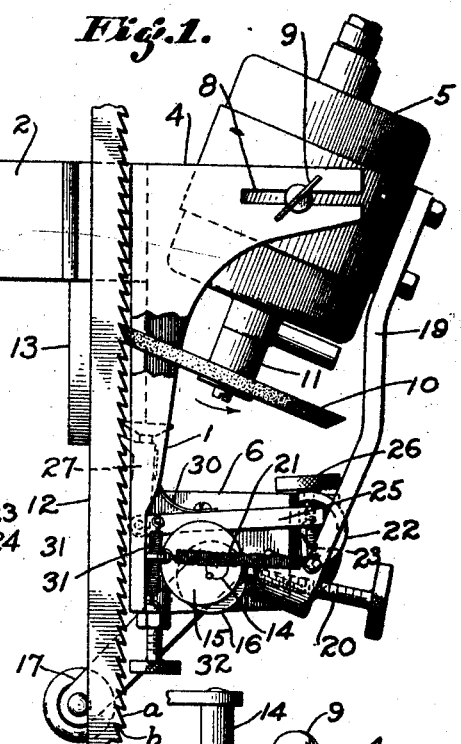
Fig. 1.
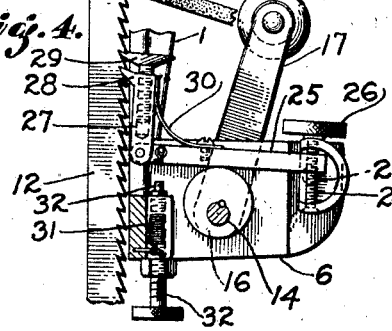
Fig. 4.
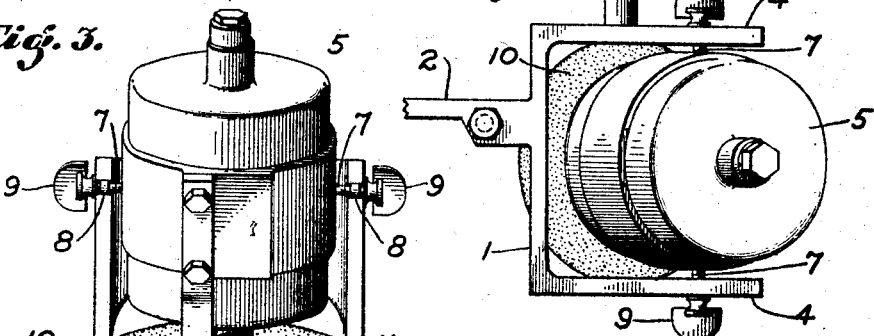
Fig. 3.
Fig. 2.
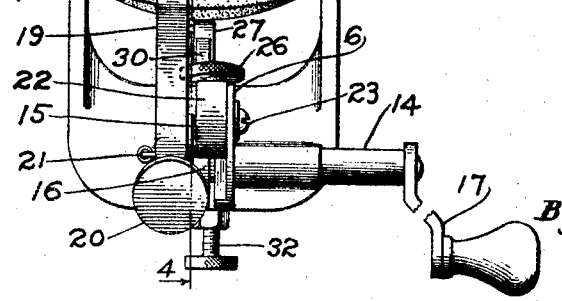
Inventor.
John Glang.
By Dewey, Strong,
Townsend & Loftus.
Attorneys.

Patented Oct. 13, 1925.

1,557,494

UNITED STATES PATENT OFFICE.

JOHN GLANG, OF SAN FRANCISCO, CALIFORNIA, ASSIGNOR OF ONE-HALF TO GEORGE OSTERTAG, OF SAN FRANCISCO, CALIFORNIA.

SAW-FILING DEVICE.

Application filed October 21, 1924. Serial No. 744,898.

*To all whom it may concern:*

Be it known that I, JOHN GLANG, a citizen of the United States, residing at the city and county of San Francisco and State of California, have invented new and useful Improvements in Saw-Filing Devices, of which the following is a specification.

This invention relates to saw sharpening means and particularly to a saw sharpening device adapted to be supported adjacent a saw to be sharpened and to automatically sharpen the teeth thereof merely by rotating a shaft. Briefly, the device comprises a motor operated saw sharpening wheel carried in a supporting frame and having cooperating therewith a mechanism for feeding the saw to intermittently bring the successive teeth thereof into sharpening position relative to the wheel. It is the object of the invention to provide an improved saw sharpening device of this type.

With the above and other objects in view, my invention consists in the features of construction and operation set forth in the following specification and illustrated in the accompanying drawing. In such drawing annexed hereto and forming a part of this specification, I have shown one specific embodiment of my invention, but it will be understood that the invention can be otherwise embodied and that the drawing is not to be construed as defining or limiting the scope of the invention, the claims appended to this specification being relied upon for that purpose.

Referring to the figures of the drawing:

Fig. 1 is a side elevation of my improved device.

Fig. 2 is a plan view thereof.

Fig. 3 is a rear elevation thereof.

Fig. 4 is a fragmentary sectional view taken on line 4—4 of Fig. 3.

Referring more specifically to the drawing by reference characters, 1 indicates a frame having a supporting arm 2 adapted to be rigidly secured to a portion of the sawing machine or an adjacent structure 3. The upper portion of the frame 1 has a pair of forwardly extending arms 4 adapted to support a motor 5 therebetween and a forwardly projecting bracket 6 at its lower portion adapted to support the operating mechanism of the device, all of which will now be specifically described.

The motor 5 is mounted for pivotal movement on trunnions 7 adjustable in slots 8 in the arms 4, screw threaded elements 9 being adapted to secure the trunnions in place in the slots. A saw sharpening wheel 10 is mounted on the downwardly extending shaft 11 of the motor. A band saw is indicated at 12, a roller 13 being provided rearwardly thereof opposite and to take the operating thrust of the wheel 10.

Rotatably mounted in the bracket 6 is a shaft 14 having a pair of eccentrics 15 and 16 thereon, a handle 17 being provided on the shaft for rotating the same. One end of an arm 19 is secured rigidly to the motor, and a screw 20 threaded into the other end thereof engages against the eccentric 15. A spring 21 normally holds the motor with its sharpening wheel 10 in engagement with the saw, rotation of the eccentric 15 being adapted to pivot the motor on its trunnions 7 in a manner to withdraw the wheel from the saw in the direction of the arrow, Fig. 1. The position of the wheel can be adjusted by rotating the screw 20.

A U-shaped element 22 pivoted to the bracket 6 at 23 has a screw 24 journalled transversely thereof and screw threaded through one end of a bar 25, a knob 26 being provided for rotating the screw. To the other end of this bar is pivoted an upwardly extending member 27 having a saw tooth engaging element 28 thereon and a second saw tooth engaging element 29 screw threaded thereinto. A spring 30 normally holds the elements in engagement with the saw teeth. A spring 31 normally holds the bar 25 downwardly against the eccentric 16, and a screw 32 limits this downward movement.

The device being mounted on the saw structure in the manner shown and described, the following adjustments are made. The motor is adjusted in the slots 8 to a position wherein the angle of the periphery of the sharpening wheel 10 corresponds to that of the saw teeth to be sharpened. As illustrated, the wheel is set to operate on both faces *a* and *b* of each saw tooth. It will be understood, however, that the motor and wheel can be set to a position in the slots 8 to operate only on one of these faces if desired, it being obvious that adjustment in these slots changes the angular position of the wheel relative to the saw teeth. The screw 20 is adjusted to permit proper engagement of the sharpening wheel with the saw. The element 29 is adjusted to a position permitting engagement of adjacent saw teeth by both elements 28 and 29. The screws 24 and 32 are adjusted to properly position the elements 28 and 29 and to permit just sufficient movement thereof to feed the saw to the proper sharpening position relative to the wheel 10. The saw tooth engaging portion of the element 29 is circular, whereby the same is adapted to engage the saw tooth whatever may be the rotative position of the element 29; this construction permitting such element to be adjusted to any position relative to the member 28 and still leave the element 29 in proper saw tooth engaging position.

The said adjustments having been properly made, the operation of the device is as follows:

The operator continually rotates the crank 17. Engagement of the screw 20 with the lower portion of the eccentric 15 permits the wheel 10 to engage and sharpen the saw. The higher portion of this eccentric operates to pivot the motor and withdraw the wheel from the saw. The eccentric 16 operates directly thereafter to move the bar 25 and element 27 upwardly to feed the saw the distance of one tooth, the screw 32 thereafter permitting the bar and element to drop below the next tooth ready for the next feeding operation. The eccentric 15 thereafter permits the spring 21 to pivot the motor to engage the sharpening wheel 10 thereof with the saw. The operation is entirely continuous and automatic, the operator being only required to rotate the crank 17.

Having thus described my invention, what I claim and desire to secure by Letters Patent is:

1. A saw sharpening device comprising the combination of a frame having means thereon for supporting the same on a saw carrying support adjacent the saw, an electric motor pivoted on the frame, a saw sharpening wheel on the motor shaft, resilient means normally holding the motor and wheel in saw sharpening position, saw feeding means comprising saw teeth engaging means carried by the frame, a shaft on the frame, a pair of eccentrics on the shaft, and means cooperating therewith and respectively adapted to pivot the motor to shift the wheel out of engagement with the saw and to thereafter operate the saw feeding means.

2. A saw sharpening device comprising the combination of a frame having means thereon for supporting the same on a saw carrying support adjacent the saw, an electric motor pivoted on the frame, a saw sharpening wheel on the motor shaft, resilient means normally holding the motor and wheel in saw sharpening position, saw feeding means comprising saw teeth engaging means carried by the frame, a shaft on the frame, a pair of eccentrics on the shaft, means cooperating therewith and respectively adapted to pivot the motor to shift the wheel out of engagement with the saw and to thereafter operate the saw feeding means, and adjusting means between each eccentric and the mechanism operated thereby.

3. A saw sharpening device comprising the combination of a frame having means thereon for supporting the same on a saw carrying support adjacent the saw, an electric motor pivoted on the frame, a saw sharpening wheel on the motor shaft, saw feeding means comprising saw teeth engaging means carried by the frame, a shaft in the frame, means including co-operating means on the shaft for pivoting the motor to shift the wheel out of engagement with the saw and thereafter operate the saw feeding means as the shaft is rotated, and means for adjusting the pivotal axis of the motor on the frame transversely of the rotary axis of the motor.

4. A saw sharpening device comprising the combination of a frame having means thereon for supporting the same on a saw carrying support adjacent the saw, an electric motor pivoted on the frame, a saw sharpening wheel on the motor shaft, saw feeding means comprising saw teeth engaging means carried by the frame, a shaft in the frame, a pair of eccentrics on the shaft, means connected to the motor and engaging one of the eccentrics, a bar having one end connected to the saw feeding means, its other end pivoted to the frame and its intermediate portion engaging the other eccentric, and means for adjusting the pivotal throw of the bar.

5. A saw tooth engaging member comprising an element adapted to engage a saw tooth, and a second circular element adapted to engage an adjacent saw tooth and having a screw threaded shank threaded into the first element, rotation of the said second element being adapted to adjust the same relative to the first element.

JOHN GLANG.